United States Patent
Matsunaga et al.

(10) Patent No.: US 6,741,307 B2
(45) Date of Patent: May 25, 2004

(54) OPTICAL DIFFUSION SHEET, OPTICAL ELEMENT, AND VIEWING DISPLAY

(75) Inventors: Takuya Matsunaga, Ibaraki (JP); Seiji Kondo, Ibaraki (JP); Atsushi Kitagawa, Ibaraki (JP); Takashi Shouda, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 10/303,353

(22) Filed: Nov. 22, 2002

(65) Prior Publication Data
US 2003/0123151 A1 Jul. 3, 2003

(30) Foreign Application Priority Data
Nov. 29, 2001 (JP) .......................... 2001-364102

(51) Int. Cl.$^7$ ............................... G02F 1/335
(52) U.S. Cl. ................... 349/112; 359/599; 313/116; 362/558
(58) Field of Search .................. 349/112; 359/599; 362/558; 313/116

(56) References Cited

U.S. PATENT DOCUMENTS 5,387,463 A    2/1995   Nakamura et al.
6,164,785 A *  12/2000  Maekawa .............. 359/613
6,563,559 B2 * 5/2003   Noritake ............... 349/113
2002/0142133 A1 10/2002 Matsunaga et al.

FOREIGN PATENT DOCUMENTS

JP    410339872 A  * 12/1998
JP    2002-196117    7/2002

* cited by examiner

Primary Examiner—Julie-Huyen L. Ngo
(74) Attorney, Agent, or Firm—Knobbe Martens Olson & Bear LLP

(57) ABSTRACT

An optical diffusion sheet comprising a transparent substrate and an optical diffusion layer having fine concavo-convex shape on a surface, wherein 60° glossiness of a surface of the fine concavo-convex shape is 70% or less, and a haze value of the optical diffusion sheet is 30% or more, and in a viewing display equipped with an optical element comprising the optical diffusion sheet provided thereto, following conditions; $C1/C0 \geq 0.2$, $C2/C0 \geq 0.1$, $C3/C0 \geq 0.1$, are satisfied, as C0 when surface illumination is 0 lux, as C1 when surface illumination is 500 lux, as C2 when surface illumination is 1000 lux, and as C3 when surface illumination is 2000 lux., prevent reflection from outside environment, is excellent antiglare property, and suppress whitish display in an image viewing display surface to give an excellent clearness, and further screen glare.

11 Claims, 1 Drawing Sheet

OPTICAL DIFFUSION SHEET, OPTICAL ELEMENT, AND VIEWING DISPLAY

BACKGROUND OF THE INVENTION

1. Field of the Invention

The present invention relates to an optical diffusion sheet used in order to suppress decrease of the screen visibility of a visual display, such as in liquid crystal displays (LCD), organic EL displays and PDP, and to an optical element having the optical diffusion sheet concerned prepared thereto. Moreover, the present invention also relates to a visual display with the optical diffusion sheet or the optical element concerned provided thereto.

2. Description of the Prior Art

Conventionally, in image viewing displays, such as LCD, an indoor lighting such as a fluorescent light, or incidence from sunlight from windows, or a reflection of operator's shadow etc. given to the viewing display surface sometimes aggravates visibility of pictures. Therefore, an optical diffusion layer is provided, on display surface, in which fine concavo-convex structure showing antiglare property, formed in order to diffuse a surface reflected light, to stop a regular reflection of outdoor daylight and to prevent a reflection of outside environment ( ) for the purpose of improvement in the visibility of images. As a formation method of optical diffusion layer, a method is mainly used in which a resin layer is formed from a coated layer having a resin containing fine-particles in dispersed state, because fine structure may be easily realized and at the same time excellent productivity may be realized by the method.

However, when a viewing display equipped with a conventional optical diffusion layer is used in bright environment, whitish display screen is obtained to aggravate the color clearness. Especially in use in the open air etc., image often cannot be recognized at all. Moreover, in the case where an LCD is required a high precision, for example having 100 ppi or more, when this LCD is equipped with the above described optical diffusion layer, a portion appears on the LCD surface that has glare, namely a different strength of brightness, probably by an effect of a fine concavo-convex structure formed with particles projected on the surface of the optical diffusion layer, thus leading to decrease in visibility. In order to solve problem of forming of this glare portion, in plenty of cases, layers having a stronger optical diffusion are used, but in this case, clearness leads to be decreased.

SUMMARY OF THE INVENTION

The present invention is providing an optical diffusion sheet having an optical diffusion layer in which reflection from outside environment is prevented even in bright environment, such as office environment and outdoors, excellent antiglare property is attained, and whitish display in an image viewing display surface is suppressed to give an excellent clearness, and further screen glare is suppressed even when this is applied to an LCD that is required high clearness.

And this invention also is providing an optical element in which the optical diffusion sheet concerned is provided. Furthermore, this invention also is providing a viewing display equipped with an optical diffusion sheet or an optical element concerned.

As a result of whole-hearted examination to solve the above described subject, the present inventors found out that the above described object might be attained using an optical diffusion sheet having characteristics shown below to complete this invention.

That is, this invention relates to an optical diffusion sheet comprising a transparent substrate and an optical diffusion layer having fine concavo-convex shape on a surface formed by a resin coated layer at least on one side of the transparent substrate, wherein 60° glossiness of a surface of the fine concavo-convex shape is 70% or less, and a haze value of the optical diffusion sheet is 30% or more, and in a viewing display equipped with an optical element comprising the optical diffusion sheet provided thereto, following conditions;

$C1/C0 \geq 0.2$ $C2/C0 \geq 0.1$ $C3/C0 \geq 0.1$ are satisfied, when a black and white contrast Cn on the optical diffusion sheet (Cn=(brightness in white display)/(brightness in black display): n is an integer of 0 to 3) is defined as C0 when surface illumination is 0 lux, as C1 when surface illumination is 500 lux, as C2 when surface illumination is 1000 lux, and as C3 when surface illumination is 2000 lux.

In the above described optical diffusion sheet, 60° glossiness of a surface with fine concavo-convex shape shows 70% or less, thereby reflection being prevented to give excellent antiglare property. The above described 60° glossiness is preferably controlled 60% or less, from the viewpoint of antiglare property. In addition, the above described 60° glossiness is 20% or less.

And in the above described optical diffusion sheet of this invention, a haze value is set 30% or more, thus diffusion of transmitted light being controlled. And thereby glare is effectively controlled even when this sheet is applied to an LCD in which high precision is required. When a haze value shows less than 30%, glare is not fully controlled in high precision system. A haze value is preferably set 40% or more. On the other hand, since transmittance will decrease when a haze value becomes higher, a haze value is preferably controlled 60% or less. Especially, a haze value is preferably controlled 40% to 50%.

Moreover, in the above described black and white contrast Cn of the above described optical diffusion sheet of this invention, black and white contrast values of C1, C2, and C3 in case surface illumination is 500 lux, 1000 lux, and 2000 lux to a black and white contrast value C0 in case surface illumination is 0 lux, respectively, are controlled so as to give values of the above described range. Thereby, even when a high surface illumination is given in bright circumstances, such as in office environment and outdoors, excellent antiglare property may be maintained, and simultaneously formation of whitish display in image viewing display surface may be controlled, as a result, leading to improvement in visibility and color repeatability.

A measuring point of luminance concerning the black and white contrast Cn is not especially limited, and generally it is about 30 to 50 cm in a position from the surface of the optical diffusion sheet.

Moreover, each of C1/C0, C2/C0, and C3/C0 is less than 1, but in order to obtain excellent clearness with prevention of whiteness degree, C1/C0 is controlled to give 0.3 or more and preferably 0.4 or more, C2/C0 is controlled to give 0.2 or more and preferably 0.3 or more, and C3/C0 is controlled to give 0.2 or more and preferably 0.3 or more.

It is preferable that a resin coated layer comprises fine particles, and surface concavo-convex form of the resin coated layer is formed by fine particles in the above described optical diffusion sheet. It is also preferable that the resin coated layer is formed with an ultraviolet curable resin.

By using fine particles, a resin coated layer having surface concavo-convex shape may be simply and reliably realized, and at the same time adjustment of the above described glossiness, haze value, and black and white contrast may also be easy. Moreover, the ultraviolet curable resin may form a resin coated layer, namely optical diffusion layer, by easy processing operation such as curing processing by irradiation of ultraviolet.

Besides, this invention relates to an optical diffusion sheet characterized by being provided with a low refractive index layer having a refractive index lower than the refractive index of the resin coated layer on a concavo-convex surface of the resin coated layer of the above described optical diffusion sheet. By existence of this low refractive index layer, antireflection function may be demonstrated and formation of whitish display of the screen in bright circumstances may be suppressed still more effectively.

And the present invention relates to an optical element characterized by the above described optical diffusion sheet prepared on one side or both sides of an optical element. An optical diffusion sheet of the present invention may be used for various kinds of applications, for example, for optical elements.

Furthermore, the present invention relates to a visual display with the above described optical diffusion sheet or the above described optical element provided thereto. An optical diffusion sheet and an optical element of this invention may be used for various kinds of uses. For example, it may be applied for viewing displays and provided on the top face of viewing displays, or on the top face and inside of viewing displays etc.

DESCRIPTION OF THE PREFERRED EMBODIMENTS

Figure 1:
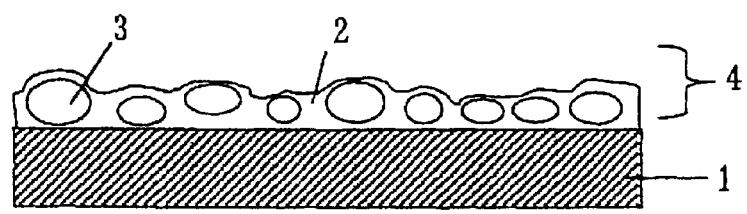
FIG. 1 is an example of sectional view of an optical diffusion sheet of this invention.

Preferred embodiments of this invention will be described hereinafter, referring to drawings. FIG. 1 illustrates an optical diffusion sheet in which an optical diffusion layer 4 comprising a resin coated layer 2 having fine particles 3 dispersed therein is formed on a transparent substrate 1. Fine particles 3 currently dispersed in the resin coated layer 2 forms concavo-convex shape on the surface of the optical diffusion layer 4. In addition, although FIG. 1 illustrates a case where the resin coated layer 2 consists of one layer, an optical diffusion layer may also be formed of two or more resin coated layers by forming separately resin coated layer including fine particles between the resin coated layer 2 and the transparent substrate 1.

As materials of the above-mentioned transparent substrate, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming transparent substrate, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; may be mentioned. And the polymer forming transparent substrate, sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Especially in optical property, a film having small birefringence is suitably used.

A thickness of a transparent substrate 1 is determined appropriately, and in general, it is approximately 10 to 500 µm so that it may have suitable thinness, or in viewpoint of workability, such as strength and handling property. Especially it is preferably 20 to 300 µm, and more preferably 30 to 200 µm.

A forming method of the resin coated layer 2 having fine concavo-convex structure surface is not especially limited so long as it is formed on the transparent substrate 1, but any proper methods may be adopted. For example, a method of forming fine concavo-convex structure on a surface of a material itself that forms the resin coated layer 2 may be mentioned. As illustrative examples, a method may be mentioned in which rough surfacing processing is beforehand given to the surface of the film used for formation of the above described resin coated layer 2 by proper manners, such as sandblasting, roll embossing, and chemical etching to give fine concavo-convex structure to the film surface. And, a method may also be mentioned in which additional coating of another resin coated layer 2 is separately given on the resin coated layer 2, and fine concavo-convex structure is given by a transfer method with metal mold etc. onto the resin coated layer surface concerned. Furthermore, as shown in FIG. 2, fine concavo-convex structure is given by dispersing fine particles 3 in the resin coated layer 2 may be mentioned. In the formation method of these fine concavo-convex structures, two or more kinds of methods may be used in combination, and a layer may be formed in which different type of fine concavo-convex structures are compounded on the surface. In the formation method of the above described resin coated layer 2, a method of forming a resin coated layer 2 that contains the fine particles 3 dispersed therein is preferable in view of easiness and reliability of formation of fine concavo-convex structure.

Hereinafter, a method will be described in which fine particles 3 are included in a dispersed state to prepare a resin coated layer 2. As resins that form the resin coated layer 2 concerned, resins in which the fine particles 3 may be dispersed, a strength sufficient as a coated layer after the resin coated layer is formed and transparency are demonstrated may be used without any limitation. Resins of thermosetting type, resins of thermoplastic type, resins of ultraviolet curable type, resins of electron beam curable type, resins of two components mixing type, etc. may be mentioned. And among them, a resin of ultraviolet curable type that may form an optical diffusion layer efficiently through easy processing operation by curing processing with UV irradiation is suitable.

Among examples of resins of ultraviolet curable type are various kinds of resin, such as polyester based, acrylic based, urethane based, amide based, silicone based, and epoxy based resins, and ultraviolet rays curing type monomers, oligomers, and polymers etc. are also included. As a resin of ultraviolet curable type used preferably, for example, a resin that has functional groups with ultraviolet rays polymerizable property and a resin that includes, as a component, acrylic based monomers and oligomers having 2 or more, especially 3 to 6 of functional groups concerned may be mentioned. And, ultraviolet rays polymerization initiator is blended in resins of ultraviolet curable type.

In the above described resin of ultraviolet curable type (formation of resin coated layer 2), additives, such as leveling agents, thixotropy agents, and antistatic agents may be used. Use of thixotropy agent is advantageous in formation of projecting particles on a fine concavo-convex structure surface. As thixotropy agents, silica, mica, smectite, etc. having particle diameter of 0.1 or less μm may be mentioned.

As fine particles 3, material having transparency, such as various metal oxide, glass, and plastic, may be used especially without any limitation. For example, among these examples are, inorganic oxide fine particles, such as silica, alumina, titania, zirconium oxide, calcium oxide, tin oxide, indium oxide, and antimony oxide; cross-linked or linear organic fine particles comprising various polymers, such as polymethylmethacrylates, polystyrenes, polyurethanes, acryl-styrene copolymers, benzoguanamine, melamines, and polycarbonates; and silicone based fine particles, etc. In addition, as inorganic fine particles, such as silica, crushed silica powder etc. may also be used and bead particles may also be used as organic fine particles. Use of organic fine particles is effective for suppressing glare. These fine particles 3 may be used independently or, two or more kinds may be selected and used in combination. An average particle diameter of the fine particles is 1 to 10 μm, and preferably 2 to 5 μm.

Formation method of the resin coated layer 2 comprising the fine particles 3 is not especially limited, but proper methods may be adopted. For example, a resin (for example an ultraviolet curable resin: coating solution) comprising the fine particles 3 is coated on the above described transparent substrate 1, then curing processing being given after dried to form a resin coated layer 2 giving concavo-convex shape on the surface. Coating of the above described resin is carried out by proper methods, such as fountain, die coater, casting, spin coat, fountain metalling, and photogravure etc. In addition, in coating processing, the above described: coating solution may be diluted with usual solvents, such as toluene, ethyl acetate, butyl acetate, methyl ethyl ketone, methyl isobutyl ketone, isopropyl alcohol, and ethyl alcohol, and they may also be coated without dilution.

In order to control surface glossiness, a haze value, and black and white contrast of the formed optical diffusion layer 4 within the above described range, an average particle diameter of the fine particles 3 and content included in the above described coating solution, and a thickness of resin coated layer 2 are suitably controlled.

Although the percentage of the fine particles 3 included in the above described coating solution is not especially limited, in order to satisfy the above described characteristics, it is preferably 1 to 20 parts by weight and more preferably 5 to 15 parts by weight to a resin 100 parts by weight. Besides, although the thickness of the resin coated layer 2 is not especially limited, it is preferably approximately 1 to 10 μm, and more especially 3 to 5 μm.

A low refractive index layer having antireflection function may be provided to the concavo-convex surface of the resin coated layer 2 that forms the above described optical diffusion layer 4. If a material has a refractive index lower than a refractive index of a resin coated layer 2, a kind of the material of low refractive index layer is not especially limited, and, for example, low refractive index materials, such as fluorinated polysiloxanes, may be used for it. A thickness of the low refractive index layer is not especially limited, and is about 0.05 to 0.3 μm, and especially preferably 0.1 to 0.3 μm.

Moreover, optical elements may be adhered to the above described transparent substrate 1 of the optical diffusion sheet in FIG. 1 (not shown).

As example of optical elements, a polarizer may be mentioned. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent substrate in the above described illustration may be used. As the above described transparent protective film, a transparent protective film whose both sides, surface side and backside, are formed from same polymer material may be used, and also a transparent protective film whose both sides are formed by different polymer materials etc. may be used. When the above described optical diffusion sheet is provided onto one side or both sides of a polarizer (a polarizing plate), a transparent substrate of the optical diffusion sheet may also serve as a transparent protective film of the polarizer.

As the opposite side of the polarizing-adhering surface above-mentioned transparent protective film, a film with a hard coat layer and various processing aiming for sticking prevention and diffusion or anti glare may be used. A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Besides, a sticking prevention processing is applied for the purpose of adherence prevention with adjoining layer. In addition, the above described hard coat layer and sticking prevention layer etc. may be built in the protection film itself, and also they may be prepared as an optical layer different from the protection layer.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although a laminating of the above described optical diffusion sheet to the optical element and of the various optical layer to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, which at least one layer of the optical element is laminated with the optical diffusion sheet, while a layer not prepared the optical diffusion sheet an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to the optical element, such as the polarizing plate, the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 $\mu$m, preferably 5 to 200 $\mu$m, and more preferably 10 to 100 $\mu$m.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical element prepared with the optical diffusion sheet of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, $\pi$ type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Although illustrative description of the present invention will be hereinafter given with reference to Examples, the present invention is not limited at all by these Examples.

Example 1

As fine particles, polystyrene beads with an average diameter of 3.5 μm 14 weight parts, an ultraviolet curable resin (urethane acrylic monomer) 100 weight parts, a benzophenic photopolymerization initiator 5 weight parts, a thixotropy agent (smectite) 2.5 weight parts, and a solvent (toluene) measured so as to give a total solid content of 32 percent by weight were mixed to prepare a coating solution. This coating solution was applied onto a triacetyl cellulose film (thickness of 80 μm), and was dried for 5 minutes at 120° C. Subsequently, curing processing was conducted by irradiation of ultraviolet ray and an optical diffusion sheet with a resin coated layer having fine concavo-convex structure surface having a thickness of approximately 5 μm was produced.

Example 2

An optical diffusion sheet was produced as in Example 1 except that a low refractive index layer (material: LR-202, manufactured by NISSAN CHEMICAL INDUSTRIES, LTD., refractive index: 1.39) having a refractive index lower than a refractive index (1.52) of the resin coated layer was added to the concavo-convex surface of the resin coated layer so that the layer might have thickness of 0.1 μm.

Comparative Example 1

A coating solution was prepared as Example 1 except that a coating solution was prepared using silica beads having an average particle diameter of 2.5 μm 14 parts by weight as fine particles, and without blending the thixotropy agent in Example 1. And, an optical diffusion sheet was produced as in Example 1 using the coating solution concerned.

Comparative Example 2

A coating solution was prepared as Example 1 except for having prepared the coating solution as in Example 1 so that a total solid content might be 37 percent by weight. And, an optical diffusion sheet was produced as in Example 1 using the coating solution concerned.

The optical diffusion sheets obtained in Examples and Comparative Examples were measured for glossiness, a haze value, and black and white contrast Cn. Results are shown in Table 1.

(Glossiness)

60° glossiness was measured using digital variable angle glossimeter UGV-5DP manufactured by Suga Testing Machine Co., according to JIS K 7105-1981.

(Haze Value)

A haze value was measured using a haze meter (HGM-2DP) manufactured by Suga Testing Machine Co., according to JIS K 7105-1981.

(Black and White Contrast)

An optical diffusion sheet having a polarization plate (thickness 185 μm) adhered thereon was attached through adhesive layer onto a liquid crystal cell of a notebook sized personal computer manufactured by Dell Computer Corporation. (panel fineness 120 ppi). In measurement of black and white contrast Cn, BM-5A manufactured by TOPCON CORPORATION was used as a luminance meter. This was placed in a distance of 50 cm in the perpendicular direction from a panel surface. Brightness in white display and brightness in black display were measured to obtain the black and white contrast under illumination of 0 lux in darkroom, of 500 lux indoor lighting, of 1000 lux and 2000 lux under natural light.

TABLE 1

|  | Glossiness (%) | Haze value (%) | Black and white contrast |  |  |  |  |  |  |
|---|---|---|---|---|---|---|---|---|---|
|  |  |  | C0 | C1 | C2 | C3 | C1/C0 | C2/C0 | C3/C0 |
| Example 1 | 59.1 | 42.1 | 225.3 | 48.9 | 39.3 | 28.0 | 0.22 | 0.17 | 0.12 |
| Example 2 | 34.0 | 40.3 | 230.0 | 69.1 | 59.6 | 57.5 | 0.30 | 0.26 | 0.25 |
| Comparative Example 1 | 20.1 | 25.0 | 319.8 | 47.6 | 20.3 | 12.9 | 0.15 | 0.06 | 0.04 |
| Comparative Example 2 | 73.0 | 37.5 | 269.5 | 64.1 | 54.9 | 35.0 | 0.24 | 0.20 | 0.13 |

Following evaluations were carried out with measurement of the black and white contrast for the optical diffusion sheets obtained in Examples and Comparative Examples. Results are shown in Table 2.

(Degree of Surface Whiteness)

Surface whiteness degree under 1000 lux was estimated by viewing based on following bases.

4: utterly no surface whiteness observed
3: almost no surface whiteness observed
2: surface whiteness observed but practically satisfactory
1: Surface looks white and image not observed (Degree of Glare)

Degree of glare was estimated by viewing on following bases in darkroom.

4: utterly no glare observed
3: almost no glare observed
2: glare observed but practically satisfactory
1: glare observed (Reflection)

Reflection of fluorescent lamps under lighting of fluorescent lamps (antiglare property) was estimated by viewing on following bases.

3: no reflection observed
2: reflection observed but practically satisfactory
1: reflection observed

TABLE 2

|  | Degree of surface whiteness | Glare | Reflection |
|---|---|---|---|
| Example 1 | 3 | 4 | 3 |
| Example 2 | 4 | 4 | 3 |
| Comparative Example 1 | 1 | 1 | 3 |
| Comparative Example 2 | 3 | 4 | 1 |

In Example 1, under lighting of 2000 lux, surface whiteness was almost not observed, but clear coloring was demonstrated, and visibility of image was excellent. In Example 2, still better degree of surface whiteness was demonstrated and surface whiteness was not observed at all. In Comparative Example 1, whiteness and glare were observed on the surface. In Comparative Example 2, although whiteness and glare were not observed on the surface, reflection was shown and antiglare property was not demonstrated.

What is claimed is:

1. An optical diffusion sheet comprising a transparent substrate and an optical diffusion layer having a concavo-convex surface formed of a resin coated layer on at least one side of the transparent substrate, wherein 60° glossiness of the fine concavo-convex surface is 70% or less, and a haze value of the optical diffusion sheet is 30% or more, and when the optical diffusion sheet is used in an optical element of a viewing display, the viewing display satisfies the following conditions:

$C1/C0 \geq 0.2$ $C2/C0 \geq 0.1$ $C3/C0 \geq 0.1$ wherein C is a black and white contrast, C=(brightness in white display)/(brightness in black display), C0 is C when surface illumination is 0 lux, C1 is C when surface illumination is 500 lux, C2 is C when surface illumination is 1000 lux, and C3 is C when surface illumination is 2000 lux.

2. The optical diffusion sheet according to claim 1, wherein the resin coated layer comprises fine particles and the concavo-convex surface of the resin coated layer is formed by the fine particles.

3. A visual display comprising the optical diffusion sheet of claim 2.

4. The optical diffusion sheet according to claim 1, wherein the resin coated layer is formed with an ultraviolet curable resin.

5. A visual display comprising the optical diffusion sheet of claim 4.

6. The optical diffusion sheet according to claim 1, further comprising a low refractive index layer having a refractive index lower than a refractive index of the resin coated layer on the concavo-convex surface.

7. An optical element comprising the optical diffusion sheet of claim 6 provided on one side or bath sides.

8. A visual display comprising the optical diffusion sheet of claim 6.

9. An optical element comprising the optical diffusion sheet of claim 1 provided on one side or both sides.

10. A visual display comprising the optical element of claim 9.

11. A visual display comprising the optical diffusion sheet of claim 1.

* * * * *